UNITED STATES PATENT OFFICE.

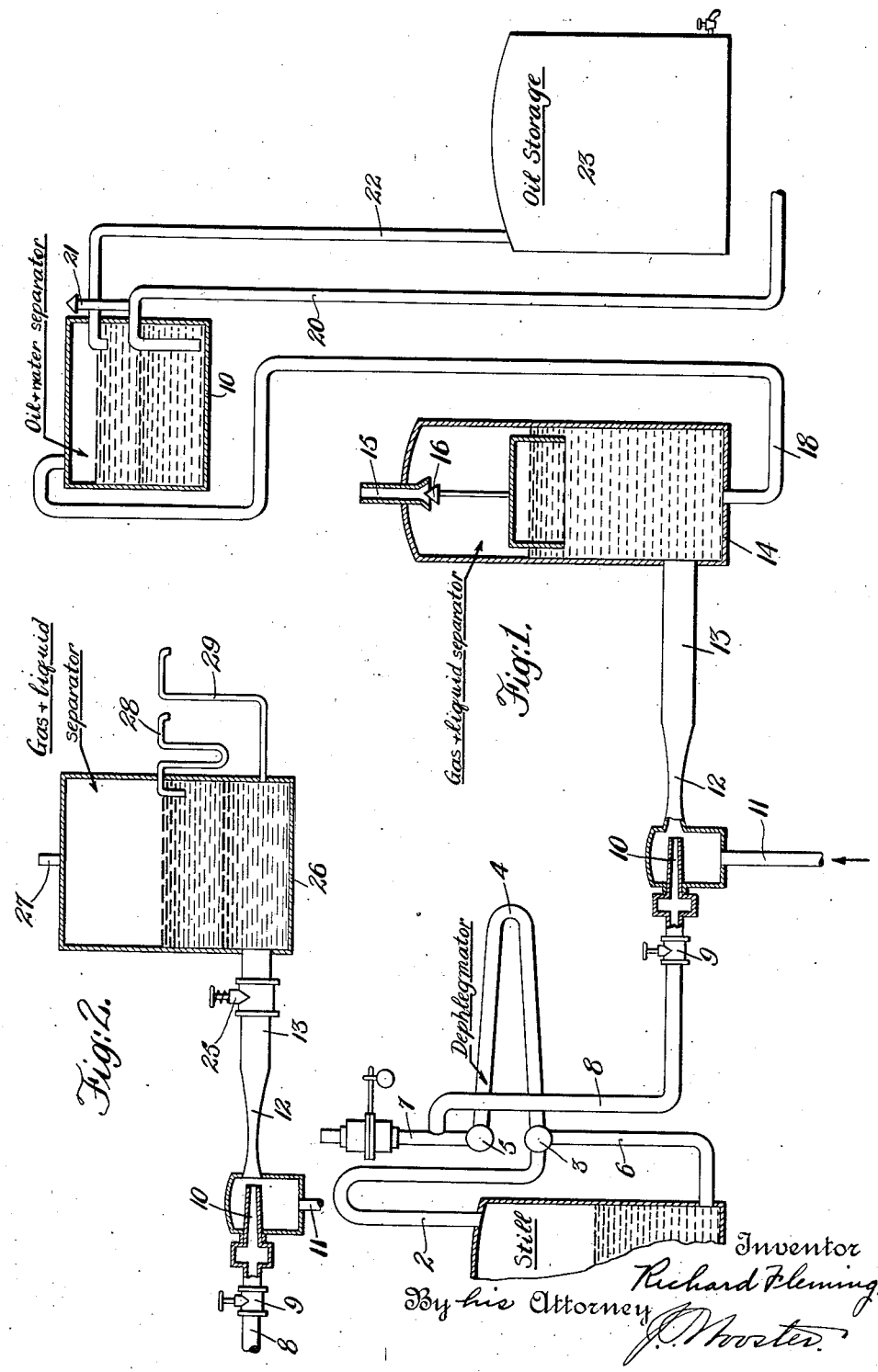

RICHARD FLEMING, OF WESTFIELD, NEW JERSEY, ASSIGNOR TO THE RICHARD FLEMING COMPANY, A CORPORATION OF DELAWARE.

APPARATUS FOR CONDENSING AND TREATING DISTILLATES.

1,394,987. Specification of Letters Patent. Patented Oct. 25, 1921.

Original application filed March 23, 1918, Serial No. 224,433. Divided and this application filed December 6, 1919. Serial No. 343,051.

*To all whom it may concern:*

Be it known that I, RICHARD FLEMING, a citizen of the United States, and resident of Westfield, in the county of Union and State of New Jersey, have invented certain new and useful Improvements in Apparatus for Condensing and Treating Distillates, of which the following is a specification.

This invention relates to treating distillates from petroleum, shale, coal tar, etc., and has for its object to reduce the time and cost of condensing vapors from pressure cracking stills, and also to enable such vapors to be simultaneously washed or treated with solutions, while being condensed. These advantages are effected by causing cracked vapors under still pressure to be continuously discharged at high velocity from the pressure vapor line into water or other suitable condensing liquid. To maintain the operating still pressure, the vapor line has a constriction such as a nozzle giving continuous discharge, and also imparting a high velocity to the vapors upon discharge. Surrounding the nozzle is a body of water or other suitable condensing liquid in sufficient volume to envelop the discharging expanding vapors whereby to very quickly condense the vapors with a minimum of decomposition into gases and unsaturated hydrocarbons. The liquid may be supplied under pressure, and may carry purifying chemicals, the mixture of condensate, gas, condensing liquid and reaction products, if any, being preferably led through a pipe constituting a mixing and condensing passage with or without back pressure producing means to a vessel wherein the various materials may separate by gravity. One purpose of such washing is to remove sulfur bearing compounds from the distillates either by washing alone, or by combined washing and chemical treatment, and this invention enables the condensation and washing to be done in one operation, and also enables the pressure at the point of condensation to be controlled so as to reduce the amount of permanent gases obtained. Such a continuous condensing and treating plant has several advantages over the cumbersome and expensive coil condensing plants now in common use in connection with pressure cracking plants, some of which maintain the vapors under cracking pressure until condensation is complete, as by having a valve on the discharge side of the condenser coil, and others of which reduce or relieve the cracking pressure on the vapors before reaching condensing portions of the coil. Such condensing plants, especially those condensing under pressure, are usually constructed with the coils immersed in cooling tanks, and are not generally continuous in operation, as both uncondensable gas and the condensate accumulate in the system and have to be intermittently drawn off. Also, it is not generally practicable to treat the vapors or condensate in coil condenser systems with water or chemicals in solution or suspension during condensation, so as to save a subsequent purifying operation.

This invention not only saves a large initial plant investment, but requires less labor and maintenance in operation than coil condenser plants of similar capacity as heretofore constructed, and gives a less yield of objectionable permanent gases and unsaturated hydrocarbons.

This application is a division of application filed March 23, 1918, Serial No. 224,433, patented December 23, 1919.

Figure 1 is an elevation of a preferred form of apparatus, and

Fig. 2 is a modification.

1 represents a still having a vapor line 2 leading to a header 3 having a series of air cooled condensing pipes 4 extending therefrom and connected to an upper header 5. 6 is a draw off pipe for the vapor condensed in pipes 4, and is preferably connected for cracking under pressure, to the bottom of the still 1, although the vapor condensed in pipe 4 can be separately collected, if desired. The vapor from a cracking still may issue at a temperature as high as 390° C., and under a pressure up to several hundred pounds per square inch, depending upon the process employed. The purpose of the condenser 4 is to condense the heavy or tarry vapor which is not desired in the distillate, before condensing the desired vapor. To this end, the surface of the condenser 4 is proportioned so as to partially cool the vapor, but still keeping it at such temperature as not to condense the lighter oils. For gasolene distillates, the condenser 4 will not ordinarily reduce the temperature below about 300° C.

The header 5 is connected to a vertical pipe 7, having a safety valve set to maintain the desired still pressure. A feature of this invention resides in putting the safety valve pipe 7 and the safety valve sufficiently beyond the reflex condenser pipe 2, and preferably the dephlegmator 4, so that sufficient cooling of the vapors will occur before reaching the safety valve, that in case the pressure does rise too high and open the valve the vapors upon discharge will not ignite. This has been a frequent trouble heretofore in high pressure cracking apparatus, namely that with the safety valve on or close to the still the vapors ignite when the valve opens and not infrequently start a disastrous fire.

From pipe 7 a pipe 8 having a control valve 9 leads to a nozzle 10 which is connected to a pipe 11 carrying the condensing and washing water or other suitable condensing liquid, or solution of chemicals. 12 is a mixing passage which narrows and then expands, as shown, into a pipe 13 connected to the bottom of a separating tank 14. The tank 14 has a gas outlet 15 at the top controlled by a valve 16 mounted on a hollow float 17, the float and valve being suitably guided so as to open and close the pipe 15 according to the fluid level in tank 14.

From the tank 14 a pipe 18 is connected to an elevated separating tank 19, having a water discharge pipe 20, with vent 21 to prevent siphon action, and an oil discharge pipe 22 leading to an oil storage tank 23.

Vapor in pipe 8 at a temperature for example of 300° C. and under a pressure of say seventy-five to one hundred pounds per square inch is discharged from the nozzle 10 at very high velocity and entrains the condensing liquid or solution supplied by pipe 11, the mixture of vapor and water occurring in passage 12 from which it flows at high velocity into the pipe 13 and thence into tank 14. This not only condenses all of the condensable vapor, but thoroughly washes it at the same time, thereby removing sulfur and various other impurities carried over by the vapor from the still. The condensing liquid also cools the nozzle. The liquid in pipe 11 can also contain chemicals, such as lead oxid or acetate, and caustic soda, or a mixture of lime, soda ash, and lead salts, for desulfurizing the condensed vapor. Also, the liquid can carry free sulfur in suspension, in addition to lead or other salts to render insoluble sulfur compounds soluble. In either case, the result is to simultaneously condense and desulfurize the vapor in a single treatment. This reduces the cost, simplifies control of the still by reason of quicker condensation, which permits samples to be more quickly obtained, and hence enables a cracking or distillation process to be much more closely followed.

For condensing vapor under pressure, where it is desired to maintain a pressure until condensation is complete, such as to prevent excessive loss in permanent gases in condensing vapor from high pressure cracking stills, it may be desired to prevent fall in pressure by the expansion of the vapor before it condenses, and by expansion of the uncondensable gases. The injector herein shown is a simple and effective condensing apparatus for all kinds of oil vapor carrying permanent gases, with pressure during condensation, because by controlling the water pressure, any desired condensing pressure can be secured. In order to condense under pressure, the water or other liquid supply will be under pressure and in such volume that, although the vapor will tend to expand after it leaves the nozzle, the liquid pressure will prevent too much expansion. The pressure to prevent expansion of gases and vapor, whether applied through an injector, or in tanks or pipes, is preferably used in combination with a back pressure producing means beyond the mixing and condensing passage, hereinafter described, which obtains an economy in liquid, but it is to be understood that either can be used without the other within the broad scope of the invention. With an injector, a wide range of condensing pressure is obtainable. Also an injector produces a high velocity, with a consequent intimate mixing of gases, vapor and liquid or chemicals. It will be further understood that the vapor line and liquid line connections 8, 11, can be reversed, and that a number of vapor jets can be used with one or more liquid connections.

The mixture entering tank 14 consists of gas, oil and condensed liquid. The gas rises and fills the inverted cup 17 tending to lift and close the valve 16. When the valve 16 closes, the gas trapped in the tank 14 accumulates sufficient pressure to force the oil and liquid through pipe 18 into the elevated tank 19. The tank 19 is elevated at such height as to furnish the back pressure in pipe 13 under which condensation is to take place. When a sufficient volume of gas has accumulated in the top of tank 14 with the valve closed, it forces the liquid into tank 19 sufficiently to cause valve 16 to open, allowing the accumulated gas to escape to the gas holder connected to pipe 15. The liquid level then rises and closes the valve, causing the operation to be repeated.

Inasmuch as the wash water is heavier than the oil it will sink to the bottom of the tank 19, but will be maintained at a constant level by the top of pipe 20, while the oil on top will flow out through the pipe 22 into the oil storage tank 23.

In Fig. 2, instead of using the gas separation tank 14, and the elevated tank 19 to provide the back pressure, the pipe 13 will be provided with an adjustable relief valve 25, connected to discharge into a separating tank 26 having a gas outlet 27, a sealed oil outlet 28 and a sealed water outlet 29, the pipes 28 and 29 being so proportioned as to provide the necessary seals and maintain the desired levels of oil and water.

While the apparatus is capable of many uses other than those specified herein, it is especially desirable in connection with the condensing of cracked products which frequently contain more sulfur than is contained in natural light fractions. However, the washing of vapor simultaneously with condensation is of advantage whether or not sulfur compounds are present.

The apparatus herein disclosed is applicable wherever similar conditions are present, and by specifying oil treatment as one example, I do not limit myself solely to oil, but intend to cover other uses where condensation is to be effected under similar conditions of pressure and temperature. Various modifications and changes in the details herein described may be made without departing from the scope of the appended claims.

What is claimed, is:

1. The combination with a pressure oil cracking still, of a vapor line for conducting the vapors away from the still, means in said line for discharging vapors at high velocity while maintaining the still pressure, and means for supplying condensing liquid in sufficient volume to envelop and condense the discharging expanding vapors.

2. The combination with a pressure oil cracking still, of a vapor line constricted to retain cracking pressure in the still while discharging vapors at high velocity, a condensing chamber receiving the discharged vapors, means for supplying a condensing liquid to the chamber in sufficient volume to envelop the discharging expanding vapors, and a common discharge for the mixture of condensing fluid, condensate and gas.

3. The combination with a pressure oil cracking still, of a vapor line terminating in a nozzle constricted to retain cracking pressure in the still while discharging vapors at high velocity, a condensing chamber receiving the discharged vapors, means for supplying a condensing liquid to the chamber in sufficient volume to envelop the discharging expanding vapors, and a common discharge for the mixture of condensing fluid, condensate and gas.

4. The combination with a pressure oil cracking still, of a vapor line constricted to retain cracking pressure in the still while discharging vapors at high velocity, a condensing chamber receiving the discharged vapors, means for supplying a condensing liquid to the chamber, and a common discharge having back pressure producing means beyond the chamber for passing the mixture of condensing fluid, condensate and gas.

5. The combination with a pressure oil cracking still, of a water jet condenser connected to said still, a common pipe receiving the gas, water and condensed oil from said condenser, and means connected to said pipe for separating gas, water and oil.

6. The combination with a pressure oil cracking still, of a vapor line constricted to retain cracking pressure in the still while discharging vapors at high velocity, a chamber receiving the discharged vapors, means for supplying a condensing liquid and chemical purifying agents to said chamber in sufficient volume to envelop the discharging expanding vapors, a common pipe receiving the resulting mixture, and gravity separating means.

7. The combination with a pressure oil cracking still, of a discharge pipe terminating in a nozzle, means for supplying condensing liquid around said nozzle, and a passage beyond said nozzle for mixing the liquid and the vapors having a restriction for maintaining a back pressure.

8. The combination with a pressure oil cracking still, of a reflux condenser for cooling the vapors, a safety valve in the vapor line beyond said condenser at such point as to discharge vapors at a temperature below their igniting point, and a vapor condenser beyond said safety valve.

9. The combination with a pressure oil cracking still, of a reflux condenser for cooling the vapors, a safety valve in the vapor line beyond said condenser at such point as to discharge vapors at a temperature below their igniting point, means in the vapor line beyond said safety valve for restricting the vapor flow to maintain cracking pressure in the still, and a liquid jet vapor condenser beyond said means.

10. The combinatian with a pressure oil cracking still, of a discharge pipe terminating in a nozzle, means for supplying liquid under pressure around said nozzle, a passage beyond said nozzle for mixing the liquid and the vapors having a restriction for maintaining a back pressure, and means for maintaining a static pressure in the passage beyond said restriction.

11. The combination with a pressure oil cracking still, of means for cooling the vapors below the flash point, a dephlegmator, a safety valve at a point where the vapors are below the ignition point, a passage leading from the dephelgmator to a nozzle, a chamber having means for supplying condensing water adjacent said nozzle, and means for discharging the resulting mixture of condensate, water and gas.

12. An oil treating apparatus comprising a still vapor delivery pipe, a condenser for partially cooling the vapor to condense heavy constituents, a vapor nozzle, a pressure water supply connected to said nozzle, a mixing passage for vapor and water, and means for separating gas, oil and water.

13. An oil treating apparatus comprising a still vapor delivery pipe, a condenser for partially cooling the vapor to condense heavy constituents, a vapor nozzle, a water supply connected to said nozzle, a mixing passage for vapor and water, means for producing pressure in said passage, and means for separating gas, oil and water.

14. An oil treating apparatus comprising a still vapor delivery pipe, an air cooled condenser for partially cooling the vapor to condense heavy constituents, a vapor nozzle, a water supply connected to said nozzle, a mixing passage for vapor and water, and means for separating gas, oil and water.

15. The combination with a pressure oil cracking still, of a nozzle discharging the cracked vapors at high velocity while maintaining the pressure in the still, and means for supplying a condensing liquid around the nozzle in sufficient volume to envelop and condense the discharging expanding vapors.

16. The combination with an oil cracking still operating at a predetermined pressure, of a nozzle discharging the cracked vapors at high velocity while maintaining the predetermined pressure in the still, and means for supplying a condensing liquid around the nozzle in sufficient volume to envelop and condense the discharging expanding vapors.

17. The combination with an oil cracking still operating at a predetermined pressure, of a nozzle restricted to maintain the predetermined pressure in the still while continuously discharging the vapor at high velocity, and means for supplying a condensing liquid around the nozzle under such pressure and in such volume as to envelop and condense the discharging expanding vapors by direct contact without excessive loss in gases or variation of still pressure.

18. The combination of an oil cracking still, a pipe for conducting off the vapors, and a liquid contact condenser connected thereto supplying liquid in sufficient volume to envelop and condense the expanding discharging vapors, said liquid carrying agents for desulfurizing the vapors during condensation.

19. The combination of a pressure oil cracking still, of a vapor pipe from said still, a pipe connected to such vapor pipe for supplying cooling liquid under pressure to effect condensation of vapors by direct contact, and a relief valve beyond said pipes to permit the discharge of products of condensation and the cooling liquid under predetermined pressure.

20. The combination of a pressure cracking still, means for conducting the vapors away from the still, means for injecting condensing liquid into the vapor to effect condensation by direct contact, and a relief valve to permit discharge of the condensing liquid and condensed products under predetermined pressure.

21. The combination with a pressure oil cracking still, of a vapor outlet, a reflux condenser connected thereto, a connection from said condenser leading to the bottom of the still, a vapor line leading from the condenser and terminating in a nozzle for maintaining still pressure and discharging vapors at a high velocity, a water chamber surrounding the nozzle and leading to a discharge line, and means for supplying water to said chamber for condensing said vapors by direct contact.

Signed at New York city, in the county of New York and State of New York this 5th day of December, A. D. 1919.

RICHARD FLEMING.